3,091,601
OLEFINIC COPOLYMERS
Frederick P. Reding, Charleston, and Charles W. McGary, Jr., South Charleston, W. Va., assignors to Union Carbide Corporation, a corporation of New York
No Drawing. Filed Sept. 20, 1957, Ser. No. 685,086
36 Claims. (Cl. 260—80.5)

The present invention relates to novel copolymers and methods of making the same. More particularly, it relates to crystalline and crystallizable copolymers of branch-chain alphaolefins and methods employed in their preparation.

This application is a continuation-in-part of the now abandoned application Serial Number 660,996, filed in the United States Patent Office May 23, 1957, by Frederick P. Reding and Charles W. McGary, Jr.

According to heretofore customary procedures it was known to polymerize certain olefinic compounds such as ethylene, propylene and the like to high molecular weight solid homopolymers. But insofar as is presently known, no methods have been found for preparing crystalline copolymers including terpolymers and the like from two or more branch-chain alpha-olefins and particularly, solid, high molecular weight substantially crystalline and crystallizable copolymers thereof.

Accordingly, the present invention comprises forming a mixture of two or more branch-chain alpha-olefin monomers, the mixture of said monomers being selected from cyclic (i.e., aromatic and cycloaliphatic) or acyclic alpha-olefins and which are members of a singly or plurally branches homologous series, each of said monomers containing at least 5 and usually up to 20 carbon atoms and preferably 5 to 12 carbon atoms, and the range in variation of the total number of carbon atoms of each of said monomers contained in said mixture being from 0 to 2 (that is, each monomer having the same number of carbon atoms or differing by not more than 2 atoms thereof from the comonomer(s) in the reaction mix) and wherein said mixture, the branch-chains of the reactant monomers are monovalent hydrocarbon radicals and those halogen substituted monovalent aromatic radicals wherein the halogen substituent(s) are attached to an aromatic nucleus, i.e., saturated hydrocarbon radicals containing at least 1 to 18 carbon atoms and preferably 1 to 10 carbon atoms, saturated aliphatic hydrocarbon radicals containing 1 and preferably 2 to 18 carbon atoms, saturated and unsaturated cycloaliphatic hydrocarbon radicals containing from 3 to 18 and preferably 3 to 10 carbon atoms and aromatic hydrocarbon radicals containing from 6 to 18 carbon atoms and preferably 6 to 10 carbon atoms, and including halogen substituted aromatic derivatives thereof; the range in variation of the total number of carbon atoms in each of the branch-chains of the monomers in said mixture being from 0 to 2 and preferably from 0 to 1; and wherein also each of said branch-chains of the reactant olefin monomers in said mixture is positioned at least 1 and preferably 2 carbon atoms removed from the nearest ethylenically (i.e., olefinically) unsaturated carbon atom (i.e., C—C—C=C)
         2  1  0

While it is essential that the branch-chains be at least one carbon atom removed from the ethylenically unsaturated group, their position relative thereto is not otherwise critical.

A "branch-chain alpha-olefin" as further defined for the purposes of this disclosure is an alpha-olefin which contains at least one carbon atom chemically bonded to at least three other carbon atoms. For example, in this category and within the purview of this invention the simplest singly branched aliphatic alpha-olefin is 3-methyl-1-butene; illustrative plurally branched aliphatic alpha-olefins are 4,4-dimethyl-1-pentene and 5,5-dimethyl-1-hexene; the simplest cycloaliphatic alpha-olefin is vinylcyclopropane; and the simplest aromatic alpha-olefin is styrene. Further it is intended to encompass within this term those alpha-olefins containing a mono- or dihalogen (i.e., F, Cl, Br, I) substituted aromatic group. Where the branch-chain alpha-olefin monomer contains a halogen substituted aromatic group, determination of the preferred comonomer(s) for polymerization therewith according to the number of carbon atoms in the branch chain or in the monomer molecule to form cocrystalline copolymers in accordance with our invention and as described above can be most desirably accomplished by treating each halogen substituent as a methyl radical; the spatial displacement of each halogen atom in this instance being approximately that of a methyl radical. It should be noted that regard for halogen substituents in these determinations while desirable and even preferred is not considered to be critical.

Also introduced to form the desired mixture is a catalyst composition composed of a halide or mixture thereof of a transition metal of groups IV–B, V–B and VI–B of the periodic table, such as, for example, vanadium, titanium or tungsten and an organo metallic compound or metal hydride selected from the following group:

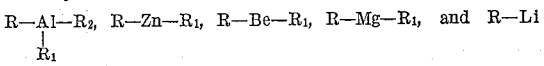

wherein Al is aluminum; Zn is zinc, Be is beryllium; Mg is magnesium; and Li is lithium; R is hydrogen or a monovalent hydrocarbon radical, that is a saturated aliphatic hydrocarbon radical containing at least two and preferably two to twelve carbon atoms; a saturated cycloaliphatic hydrocarbon radical containing at least three and preferably three to twelve carbon atoms; or an aromatic hydrocarbon radical containing six to twelve or more carbon atoms; and each of $R_1$ and $R_2$ is hydrogen or a monovalent hydrocarbon radical, i.e., a saturated aliphatic hydrocarbon radical containing at least two and preferably two to twelve carbon atoms, a saturated cycloaliphatic hydrocarbon radical containing at least three and preferably three to twelve carbon atoms; an aromatic hydrocarbon radical containing six to twelve or more carbon atoms; or a halogen when no hydrogen is linked directly to the metallic nucleus, i.e., when each of R, $R_1$ and $R_2$ is other than hydrogen; together optionally with an inert diluent and heating said mixture to a temperature ranging from 0° C. to 150° C. and above, to cause the formation of crystalline or crystallizable copolymers of said monomers.

Illustratively, the following olefin monomers can be copolymerized in accordance with the practice described herein to yield the corresponding copolymers: 3-methyl-1-butene and 4-methyl-1-pentene; 3-methyl-1-pentene and 4-methyl-1-pentene; 3-methyl-1-hexene and 4-methyl-1-pentene; allylcyclopentane with allylcyclohexane; allylcyclohexane with 4-cyclohexyl-1-butene; allylcyclohexane with styrene; 1-allylnaphthalene with 2-vinylnaphthalene; allylbenzene with 4-phenyl-1-butene; styrene with allylbenzene; styrene with para-chlorostyrene or with an isomeric mixture of ortho, meta and para-styrene; 4-(2-naphthyl)-1-butene with 1-allylnaphthalene; 1-allylnaphthalene with 4-(1-naphthyl)-1-butene; 4-(1-naphthyl)-1-butene with 4-(2-naphthyl)-1-butene; 9-allylfluorene with 2-allylfluorene; 4-allyl-1-cyclohexene with 4-vinyl-1-cyclohexene; 4-allyl-1-cyclohexene with allylcyclohexane; 4-allyl-1-cyclohexene with vinylcyclohexane; 1-allyl-4-chlorobenzene with styrene; 1-allyl-4-chlorobenzene with allylbenzene; and 4,4-dimethyl-1-pentene with 5,5-dimethyl-1-hexene.

The product copolymers prepared in accordance with the practice of our invention, for example and most particularly, the copolymers of 3-methyl-1-butene and 4-methyl-1-pentene are much tougher than the homopolymers, poly-3-methyl-1-butene and poly-4-methyl-1-pentene having similar molecular weights (melt indices), as well as possessing superior clarities, melting points, oxidation resistance and equal or greater stiffness values than corresponding polyethylenes or polypropylenes.

These high stiffness values and melting points are due to the high degree of crystallinity over the entire composition range of the copolymers of our invention. This crystallinity is shown by X-ray diffraction patterns. Normally, the incorporation of a comonomer into a polymer chain disrupts the crystallinity, and even at relatively low combined comonomer concentration, the ability to crystallize is destroyed.

The copolymers of 3-methyl-1-butene and 4-methyl-1-pentene of our invention are characterized by stiffnesses in the range of 110,000 p.s.i. to 275,000 p.s.i. at 25° C. with melting points from 210° C. to 300° C. as the proportion of 3-methyl-1-butene constituent is varied from 0 to 100 percent, respectively. The proportions of 3-methyl-1-butene and 4-methyl-1-pentene can be varied over this entire range to yield desirable copolymers.

The cocrystalline copolymers of this invention are useful in the production by extrusion or molding of shaped articles, i.e., gear boxes, self-lubricating bearings, and particularly those articles requiring high use temperatures as well as solvent resistant funnels, beakers, bottles, sinks and the like, which articles are prepared by standard procedures. Certain of these cocrystalline copolymers, i.e., the copolymers of 3-methyl-1-butene and 4-methyl-1-pentene, are especially useful in the formation of textile fibers for employment in those applications requiring high strength characteristics and resistance to the effects of high temperature.

The polymerization reaction can occur in the absence of a diluent but the presence of a suitable organic diluent is preferred. Suitable inert organic diluents are those which serve as the solvent for the monomer, but need not necessarily function as such for either the product copolymers or the catalyst. Appropriate inert organic diluents are saturated aliphatic, saturated cycloaliphatic and aromatic hydrocarbons. The amount of diluent present to obtain a suspension polymerization is not critical. In general, it is, of course, desirable to have at least one percent by weight of monomer in the diluent although this restriction is an economical one. Nor are metal halide to diluent ratios critical. Thus ratios of at least 0.05 millimol of metal halide per 100 grams of diluent are thoroughly operative. The diluent, however, must not contain certain highly polar substituents, (i.e., nitriles and the like), oxygen, sulfur, active hydrogen (i.e., alcohols, water, certain amines) or olefinic unsaturation which react with the catalyst and consequently inactivate it. Usually it is considered desirable economically to have 10 grams or more of monomer per gram of metal halide present in the reaction mixture although these proportions are likewise lacking in criticality. Suitable hydrocarbon solvents are, for example, toluene, benzene, xylene, methylcyclohexane, cyclohexane, hexane, heptane, and highly purified kerosene. Aromatic diluents such as benzene and toluene are preferred diluents due to their greater efficiency as wetting agents for the copolymer.

The catalyst employed herein is composed of two components as described hereinabove, which may or may not react chemically with each other in the reaction mix. The first component is an organometallic compound or metal hydride such as, for example, triisobutylaluminum, trioctylaluminum, tributylaluminum, triethylaluminum, triisopropylaluminum, tridodecylaluminum, triphenylaluminum, diethylaluminum chloride, diisobutylaluminum chloride, dioctylaluminum chloride, didodecylaluminum chloride, monoisobutylaluminum hydride, diethylaluminum hydride, diisobutylaluminum hydride, dioctylaluminum hydride, didodecylaluminum hydride, aluminum hydride, diethylberyllium, diisobutylberyllium, dioctylberyllium, didodecylberyllium, diphenylberyllium, ethylberyllium chloride, isobutylberyllium chloride, octylberyllium chloride, beryllium hydride, dodecylberyllium chloride, lithium hydride, phenyl lithium, naphthyl lithium, isobutyl lithium, cyclohexyl lithium, dodecyl lithium, diethylzinc, diisobutylzinc, dioctylzinc, didodecylzinc, diphenylzinc, ethylzinc chloride, isobutylzinc chloride, octylzinc chloride, zinc hydride, decylzinc chloride, cyclopropylzinc chloride, diisobutylmagnesium, dioctylmagnesium, didodecylmagnesium, diphenylmagnesium, isobutylmagnesium chloride, octylmagnesium chloride, magnesium hydride and dodecylmagnesium chloride. The preferred organo metallic cocatalyst is a trialkylaluminum, i.e., triisobutylaluminum. The second component is a metallic halide such as vanadium tetrachloride, vanadium trichloride, vanadium dichloride, vanadyl trichloride, vanadyl dichloride, titanium tetrachloride, titanium trichloride, titanium dichloride, zirconium tetrachloride, chromium trichloride, chromyl dichloride, titanium tetrafluoride, titanium trifluoride, titanium tetrabromide, titanium tribromide, tungsten tetrachloride and tungsten hexachloride. Vanadium trichloride and titanium trichloride are most advantageously employed in this regard. Halides or oxyhalides of other metals in groups IV–B, V–B or VI–B of the periodic system of the elements, for example, zirconium, hafnium, niobium, tantalum, chromium or molybdenum, can be used in place of the titanium trichloride or other metallic halide.

The molecular ratio of the trialkylaluminum to vanadium or titanium trichloride can vary from 0.1 to 10 or more. The ratio employed is not narrowly critical and may be varied considerably. Thus, the polymerization works as well at higher ratios while a preferred ratio for efficient and economic operation is from 0.5 to 5.0. The function of these metallic halides being that of catalysts or initiators, any catalytic amount can be used.

The techniques used in combining the catalyst, diluent and monomer are well known procedures designed to exclude moisture. The alkylaluminum cocatalyst can be added to the diluent, where diluent is employed, in the reaction vessel prior to the addition of the metal halide cocatalyst; however, these various components can be added in reverse order also. The monomer is introduced as a liquid and the vessel is then sealed with subsequent stirring of the reaction mix at the desired temperature. The reaction then takes place under autogeneous pressure.

If desired, polymerization can be conducted at atmospheric, superatmospheric or subatmospheric pressures in agitator equipped vessels. In such case, air and moisture can be excluded by maintaining an inert atmosphere (e.g., nitrogen), and a grinding medium may optionally be included in the reaction mix (e.g., glass beads), for the purpose of decimating the metal halide and continuously renewing exposed surfaces of the decimated particulate metal halide to the monomer.

This latter procedure results uniformly in an increased yield of polymer especially when solid metal halides are employed. However, where vanadium trichloride is utilized, as the cocatalyst with or without agitation and grinding in situ as described immediately hereinabove, a marked and unexpectedly larger yield of product polymer results.

The temperature of polymerization has a marked effect on the molecular weight of the polymer obtained. In general, the higher the temperature, the lower is the molecular weight. Temperatures ranging from 25° C. to about 85° C. are most advantageously employed. Polymerization is very rapid and concomitantly the molecular weight of the product polymer is very low at temperatures in excess of 150° C. At temperatures below 0° C., the polymerization rate falls to very low values.

The period of time during which the polymerization reaction is permitted to proceed is not critical. Thus, periods of as little as a few minutes (e.g., 5 minutes) to 4 hours or 7 days can be employed. The longer the reaction period the more complete the conversion. Factors such as, for example, the reaction temperature and the position of the side chain will influence the rate of reaction. Thus, lower polymerization temperatures and relative closeness of the side chains from the ethylenically unsaturated group of the reaction monomers will slow the reaction.

The term "stiffness" as used herein refers to the tensional modulus which is calculated by multiplying by one hundred, the force necessary to stretch a sample of polymer one percent of its original length. These values are measured by an Instron tester made by the Instron Engineering Company of Quincy, Massachusetts (Model 37).

The term "melt index" as is employed throughout this specification refers to the melt index test which is described in detail in ASTM Test Procedure D1228–52T, Procedure A, modified in the temperature employed is 325° C. A ten gram sample placed in a ⅜ inch diameter tube at 325° C. and a load of 2610 grams is applied to a plunger which forces the melted polymer through a die having a diameter of 0.0825 inch. The "melt index" of the polymer is the rate in decigrams per minute, at which the polymer is extruded under these conditions. Illustratively, polymers of such high molecular weights as those disclosed herein extrude more slowly and therefore have a lower melt index.

It should also be noted that the term "copolymer" as employed herein refers to polymers containing two or more polymerized branched alpha-olefin monomers and thus includes terpolymers and the like as well.

The following examples are further illustrative of the invention.

*Example 1*

The following materials were placed in a bottle under an atmosphere of nitrogen.

150 ml. of benzene
35 grams of 3-methyl-1-butene
5 grams of 4-methyl-1-pentene
5.2 grams of triisobutylaluminum
1.0 gram of vanadium trichloride The bottle was then rotated in a 50° C. bath for 70 hours after which time the mixture was thick with suspended copolymer of 3-methyl-1-butene and 4-methyl-1-pentene. The catalyst residue was removed by washing the polymer with isopropanol and water containing hydrochloric acid. The copolymer was then washed with isopropanol and water until it was acid free and was dried. The copolymer weighed 18 grams, and had a density of 0.875 g./cc. at 25° C., a melt index (325° C.) of 0.99 and stiffnesses of 1,000; 10,000, 100,000 and 220,000 p.s.i. at 244°, 154°, 39° and 25° C., respectively. The metallic halide employed in this and the following examples was ground before use by shaking a mixture of the halide, glass beads and diluent in a bottle before use. A Red-Devil paint mixer was employed for shaking the mixture.

*Example 2*

The following materials were placed in a bottle under an atmosphere of nitrogen.

150 ml. of benzene
35 grams of 3-methyl-1-butene
5 grams of 4-methyl-1-pentene
5.2 grams of triisobutylaluminum
1.0 gram of vanadium trichloride The bottles were then rotated in a 50° C. bath for 42 hours after which the polymerization mixture was thick with suspended copolymer. The catalyst residue was removed by washing the copolymer of 3-methyl-1-butene and 4-methyl-1-pentene with isopropanol and water containing hydrochloric acid. The dried copolymer weighed 27 grams, had a density of 0.880 g./cc. at 25° C., a melt index (325° C.) of 0.31, and stiffnesses of 1,000; 10,000; 100,000 and 260,000 p.s.i. at 279°, 168°, 41° and 25° C., respectively. A molded plaque was tough and clear.

*Example 3*

Example 2 was repeated except that 30 grams of 3-methyl-1-butene and 10 grams of 4-methyl-1-pentene were used. A 27 gram yield of copolymer was obtained and the copolymer had a density of 0.864 g./cc. at 25° C., a melt index (325° C.) of 0.56, and stiffnesses of 100; 1,000; 10,000; 100,000 and 235,000 p.s.i. at 240°, 206°, 110°, 35°, 25° C. respectively. The copolymer was tough and clear.

*Example 4*

Example 2 was repeated except that 20 grams of 3-methyl-1-butene and 20 grams of 4-methyl-1-pentene were used. The copolymer weighed 34 grams, had a density of 0.854 g./cc. at 25° C., a melt index (325° C.) of 1.4, and stiffnesses of 100; 1,000; 10,000; 100,000 and 202,000, p.s.i. at 208°, 192°, 105°, 36°, and 25° C., respectively. The copolymer was tough and clear.

*Example 5*

The following materials were placed in a bottle under an atmosphere of nitrogen.

150 ml. of benzene
10 grams of 3-methyl-1-butene
30 grams of 4-methyl-1-pentene
5.4 grams of triisobutylaluminum
1.0 gram of vanadium trichloride The bottle was rotated in a 50° C. bath for 65 hours after which time the mixture was thick with suspended copolymer. The copolymer was washed as previously to remove the catalyst residue and weighed 38 grams after drying. The copolymer had a density of 0.841 g./cc., at 25° C., a melt index (325° C.) of 1.4, and stiffnesses of 1,000; 10,000; 100,000 and 152,000 p.s.i. at 151°, 69°, 31°, and 25° C., respectively.

*Example 6*

Example 5 was repeated except that 5 grams of 3-methyl-1-butene and 35 grams of 4-methyl-1-pentene were used. The dried copolymer weighed 36 grams and had a density of 0.836 g./cc. at 25° C., a melt index (325° C.) of 0.69, and stiffnesses of 1,000; 10,000; 100,000 and 153,000 p.s.i. at 179°, 52°, 31.5°, and 25° C., respectively.

*Example 7*

The following materials were placed in a bottle under an atmosphere of nitrogen.

150 ml. of benzene
20 grams of 3-methyl-1-butene
20 grams of 4-methyl-1-pentene
5.2 grams of triisobutylaluminum
1.0 gram of titanium trichloride The bottle was then rotated in a 50° C. bath for 232 hours after which time the mixture was thick with suspended copolymer. The copolymer was washed as previously and after drying, weighed 32 grams. The copolymer had a melt index (325° C.) of 12, and stiffnesses of 1,000; 10,000; 100,000 and 178,000 p.s.i. at 165°, 75°, 36°, and 25° C., respectively.

*Example 8*

The following materials were placed in a bottle under an atmosphere of nitrogen.

200 ml. of toluene
36 grams of 3-methyl-1-butene 4 grams of 4-methyl-1-pentene
5.0 grams of triisobutylaluminum
1.0 gram of vanadium trichloride The bottle was rotated in a 50° C. bath for 112 hours after which time the mixture was solid with suspended polymer. After working up the copolymer as previously, a 31 gram yield of dried copolymer was obtained. The copolymer had a melt index (325° C.) of 5.7 and stiffnesses of 1,000; 10,000; and 100,000 p.s.i. at 225°, 151°, and 58°, respectively.

It should be noted that the infrared spectra of the products obtained in Examples 1 through 8 showed that units of both monomers were incorporated in the polymer. The X-ray diffraction pattern of the products indicated the polymers were crystalline with a crystalline diffraction pattern different from those of the homopolymers of the two monomers. This latter fact indicates that the two monomer units in the copolymer chain had cocrystallized. Molded plaques of the products were clear indicating true homogeneous copolymers rather than mixtures of homopolymers.

Example 9

The following materials were placed in a bottle under an atmosphere of nitrogen.

150 ml. of toluene
15 grams of allylcyclopentane
15 grams of allylcyclohexane
5.0 grams of triisobutylaluminum
2.0 grams of vanadium trichloride The bottle was capped and rotated in a 50° C. bath for 90 hours. The catalyst residues were removed from the formed polymer with isopropanol containing hydrochloric acid. The copolymer was then washed with isopropanol and water until it was acid free and it was then dried. The product weighed 14.5 grams and had a density of 0.942 g./cc.

The infrared spectrum of the product showed that units of both monomers were incorporated in the polymer. The X-ray diffraction pattern of the product indicated the polymer was crystalline with a crystalline diffraction pattern somewhat different from those of the homopolymers of the two monomers. This latter fact indicates that the two monomer units in the copolymer chain had cocrystallized. The crystal melting point of the copolymer was 205° C. compared to 230° C. and 210° C. for homopolymeric allylcyclohexane and allylcyclopentane, respectively. A molded plaque of the product was clear indicating a true homogeneous copolymer rather than a mixture of polymers.

Example 10

The following materials were placed in a bottle under an atmosphere of nitrogen.

100 ml. of toluene
10 grams of 3-methyl-1-pentene
10 grams of 4-methyl-1-pentene
3.0 grams of triisobutylaluminum
0.6 gram of vanadium trichloride The bottle was capped and rotated in a 50° C. bath for 16 hours. The catalyst residues were removed as described in the other examples. The dried copolymer weighed 17 grams and had a density of 0.857 g./cc.

The infrared spectrum of the product showed that units of both monomers were present in the polymer. The X-ray diffraction pattern showed the product to be crystalline with a crystal diffraction pattern different from those of the homopolymers of the two monomers. This latter fact indicates that the two monomer units in the copolymer chain had cocrystallized. The melting point of the copolymer was 235° C. compared to 240° C. and 200° C. for homopolymeric 4-methyl-1-pentene and 3-methyl-1-pentene respectively. A molded plaque of the product was clear indicating a homogeneous copolymer.

Example 11

The following materials were placed in a bottle under an atmosphere of nitrogen.

100 ml. of toluene
10 grams of 3-methyl-1-hexene
10 grams of 4-methyl-1-pentene
3.0 grams of triisobutylaluminum
0.6 gram of vanadium trichloride The bottle was capped and rotated in a 50° C. bath for six days. The catalyst residues were removed as described in the other examples. The dried copolymer weighed nine grams and had a density of 0.842 g./cc.

The infrared spectrum of the product showed the polymer contained both monomer units. The X-ray diffraction pattern was crystalline and similar to that of homopolymeric 4-methyl-1-pentene. However, small differences in the pattern demonstrate that the product is a cocrystalline copolymer rather than poly-4-methyl-1-pentene. The melting point of the product was 220° C. compared to 240° C. and 280° C. for homopolymeric 4-methyl-1-pentene and 3-methyl-1-hexene. A molded plaque of the product was clear indicating a homogeneous copolymer rather than a mixture.

Example 12

The following materials were placed in a bottle under an atmosphere of nitrogen.

150 ml. of toluene
15 grams of allylcyclohexane
15 grams of 4-cyclohexyl-1-butene
5.0 grams of triisobutylaluminum
1.5 grams of titanium trichloride The bottle was capped and rotated in a 50° C. bath for 90 hours. The catalyst residue was removed from the formed polymer with isopropanol containing hydrchloric acid. The copolymer was then washed with isopropanol and water until it was acid free and it was then dried. The copolymer weighed 12 grams and had a density of 0.951 g./cc.

Example 13

The following materials were placed in a bottle under an atmosphere of nitrogen.

150 ml. of toluene
15 grams of styrene
15 grams of allylcyclohexane
5.0 grams triisobutylaluminum
2.0 grams of titanium trichloride The bottle was capped and rotated in a 50° C. bath for 6 days. The catalyst residue was removed from the formed polymer with isopropanol containing hydrochloric acid. The copolymer was then washed with isopropanol and water until it was acid free and it was then dried. The copolymer weighed 20 grams and had a density of 1.003 g./cc.

The infrared spectrum of the product showed that both monomer units were included in the polymer. The X-ray diffraction pattern showed the product to be crystalline. The product melted at 220° C. compared to 230° C. for each of the respective homopolymers.

Example 14

The following materials were placed in a bottle under an atmosphere of nitrogen.

100 ml. of toluene
15 grams of para-allyl toluene
15 grams of styrene
4.0 grams of triisobutylaluminum
1.0 gram of vanadium trichloride The bottle was rotated in a 50° C. bath for 94 hours after which time the mixture was thick with suspended copolymer of para-allyl toluene and styrene. The catalyst residue was removed by washing the polymer with isopropanol and water containing hydrochloric acid. The dried, crystalline copolymer weighed 22 grams and had a density of 1.046 grams per cc. at 25° C. and a melting point of 192° C. to 198° C. Infrared analysis further indicated the presence of both monomers in the copolymer.

*Example 15*

The following materials were placed in a bottle under an atmosphere of nitrogen.

75 ml. of toluene
10 grams of allylbenzene
10 grams of 1-allyl-4-chlorobenzene
2.0 grams of triisobutylaluminum
0.8 gram of vanadium trichloride This reaction mix was treated in a manner similar to that described in Example 14 except that the reaction was carried on for a total of 34 hours while being vibrated in a Red-Devil paint mixer and resulted in the isolation of 15 grams of a dried copolymer of allylbenzene and 1-allyl-4-chlorobenzene of high crystallinity as determined by X-ray diffraction having a melting point of about 223° C. Infrared analysis further indicated the presence of both monomers in the copolymer.

*Example 16*

The following materials were placed in a bottle under an atmosphere of nitrogen.

100 ml. of hexane
10 grams of 4-cyclohexyl-1-butene
10 grams of 4-phenyl-1-butene
3.0 grams of triisobutylaluminum
1.0 gram of titanium trichloride The reaction mix was treated in a manner similar to that described in Example 14 except that the reaction was carried on for a total of 18 hours and resulted in the isolation of 16 grams of dried, crystalline copolymer of 4-cyclohexyl-1-butene and 4-phenyl-1-butene having a density of 1.0645 and a melting point of 118° C. to 123° C. Infrared analysis further indicated the presence of both monomers in the copolymer.

*Example 17*

The following materials were placed in a bottle under an atmosphere of nitrogen.

100 ml. of toluene
10 grams of styrene
10 grams of 4-phenyl-1-butene
3.0 grams of triisobutylaluminum
1.0 gram of vanadium trichloride The reaction mix was treated in a manner similar to that described in Example 14 except that the reaction was carried on for a total of 18 hours and resulted in the isolation of 16 grams of dried copolymer of styrene and 4-phenyl-1-butene having a high crystallinity as determined by X-ray diffraction, a density of 1.0645 and a melting point of 152° C. to 156° C. Infrared analysis further indicated the presence of both monomers in the copolymer.

*Example 18*

The following materials were placed in a bottle under an atmosphere of nitrogen.

100 ml. of heptane
10 grams of allylcyclohexane
10 grams of 4-phenyl-1-butene
3.0 grams of triisobutylaluminum
1.0 gram of titanium trichloride The reaction mix was treated in a manner similar to that described in Example 14 except that the reaction was carried on for a period of 42 hours. The product obtained was 13 grams of dried copolymer of allylcyclohexane and 4-phenyl-1-butene having a density of 1.0240 and a melting point of 130° C. to 133° C. Infrared analysis further indicated the presence of both monomers in the copolymer.

*Example 19*

The following materials were placed in a bottle under an atmosphere of nitrogen.

150 ml. of toluene
15 grams of styrene
15 grams of 1-allyl-4-chlorobenzene
5.0 grams of triisobutylaluminum
2.0 grams of vanadium trichloride The reaction mix was treated in a manner similar to that described in Example 14 except that the reaction was carried on for a period of 72 hours. Twelve grams of dried, crystalline copolymer of styrene and 1-allyl-4-chlorobenzene wherein the crystallinity was determined by X-ray diffraction was obtained and was further characterized by having a density of 1.1525 and a melting point of 212° C. to 215° C. Infrared analysis further indicated the presence of both monomers in the copolymer.

*Example 20*

The following materials were placed in a bottle under an atmosphere of nitrogen.

50 grams of toluene
10 grams of 1-allylnaphthalene
10 grams of 4-(2-naphthyl)-1-butene
4.0 grams of triisobutylaluminum
2.0 grams of vanadium trichloride The reaction mix was treated in a manner similar to that described in Example 14 except that the reaction was carried on for a period of 96 hours. 10.5 grams of dried, crystalline copolymer of 1-allylnaphthalene and 4-(2-naphthyl)-1-butene wherein the crystallinity was determined by X-ray diffraction was obtained. This copolymer was further characterized by a density of 1.1200 grams per cubic centimeter and a melting point of 151° C. to 160° C. Infrared analysis further indicated the presence of both monomers in the copolymer.

What is claimed is:

1. The method for producing a solid cocrystalline copolymer of 3-methyl-1-pentene and 4-methyl-1-pentene having a high degree of crystallinity over the entire composition range as determined by its X-ray diffraction pattern which comprises forming a mixture of 3-methyl-1-pentene and 4-methyl-1-pentene, together with a catalyst consisting essentially of a halide of a transition metal selected from the group consisting of group IV–B, group V–B and group VI–B of the periodic table and a compound selected from the group consisting of:

$$R-Al-R_3, \quad R-Zn-R_1, \quad R-Be-R_1, \quad R-Mg-R_1, \text{ and } R-Li$$
$$\underset{R_1}{|}$$

wherein Al is aluminum, Mg is magnesium, Zn is zinc, Be is beryllium, Li is lithium, R is a member selected from the group consisting of hydrogen, an aromatic hydrocarbon radical containing from 6 to 12 carbon atoms, a saturated aliphatic hydrocarbon radical containing 2 to 12 carbon atoms and a saturated cycloaliphatic hydrocarbon radical containing 3 to 12 carbon atoms, each of $R_1$ and $R_2$ is a member selected from the group consisting of hydrogen, a saturated aliphatic hydrocarbon radical containing 2 to 12 carbon atoms, a saturated cycloaliphatic hydrocarbon radical containing 3 to 10 carbon atoms and an aromatic hydrocarbon radical containing 6 to 12 carbon atoms, and halogen when no hydrogen is linked directly to the metallic nucleus, and heating said mixture at a temperature of from 0° C. to 150° C. to cause the formation of a substantially crystalline copolymer of 3-methyl-1-pentene and 4-methyl-1-pentene.

2. The method for producing a solid cocrystalline copolymer of 3-methyl-1-hexene and 4-methyl-1-pentene having a high degree of crystallinity over the entire composition range as determined by its X-ray diffraction pattern which comprises forming a mixture of 3-methyl-1-hexene and 4-methyl-1-pentene, together with a catalyst consisting essentially of a halide of a transition metal selected from the group consisting of group IV–B, group V–B and group VI–B of the periodic table and a compound selected from the group consisting of:

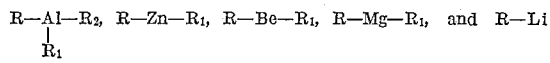

wherein Al is aluminum, Mg is magnesium, Zn is zinc, Be is beryllium, Li is lithium, R is a member selected from the group consisting of hydrogen, an aromatic hydrocarbon radical containing from 6 to 12 carbon atoms, a saturated aliphatic hydrocarbon radical containing 2 to 12 carbon atoms and a saturated cycloaliphatic hydrocarbon radical containing 3 to 12 carbon atoms, each of $R_1$ and $R_2$ is a member selected from the group consisting of hydrogen, a saturated aliphatic hydrocarbon radical containing 2 to 12 carbon atoms, a saturated cycloaliphatic hydrocarbon radical containing 3 to 10 carbon atoms and an aromatic hydrocarbon radical containing 6 to 12 carbon atoms, and halogen when no hydrogen is linked directly to the metallic nucleus, and heating said mixture at a temperature of from 0° C. to 150° C. to cause the formation of a substantially crystalline copolymer of 3-methyl-1-hexene and 4-methyl-1-pentene.

3. The method for producing a solid cocrystalline copolymer of allylcyclopentane and allylcyclohexane having a high degree of crystallinity over the entire composition range as determined by its X-ray diffraction pattern which comprises forming a mixture of allylcyclopentane and allylcyclohexane, together with a catalyst consisting essentially of a halide of a transition metal selected from the group consisting of group IV–B, group V–B and group VI–B of the periodic table and a compound selected from the group consisting of:

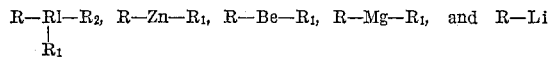

wherein Al is aluminum, Mg is magnesium, Zn is zinc, Be is beryllium, Li is lithium, R is a member selected from the group consisting of hydrogen, an aromatic hydrocarbon radical containing from 6 to 12 carbon atoms, a saturated aliphatic hydrocarbon radical containing 2 to 12 carbon atoms and a saturated cycloaliphatic hydrocarbon radical containing 3 to 12 carbon atoms, each of $R_1$ and $R_2$ is a member selected from the group consisting of hydrogen, a saturated aliphatic hydrocarbon radical containing 2 to 12 carbon atoms, a saturated cycloaliphatic hydrocarbon radical containing 3 to 10 carbon atoms and an aromatic hydrocarbon radical containing 6 to 12 carbon atoms, and halogen when no hydrogen is linked directly to the metallic nucleus, and heating said mixture at a temperature of from 0° C. to 150° C. to cause the formation of a substantially crystalline copolymer of allylcyclopentane and allylcyclohexane.

4. The method for producing a solid crystalline copolymer of 3-methyl-1-butene and 4-methyl-1-pentene having a high degree of crystallinity over the entire composition range as determined by its X-ray diffraction pattern which comprises forming a mixture of 3-methyl-1-butene and 4-methyl-1-pentene, together with a catalyst consisting essentially of a halide of a transition metal selected from the group consisting of group IV–B, group V–B and group VI–B of the periodic table and a compound selected from the group consisting of:

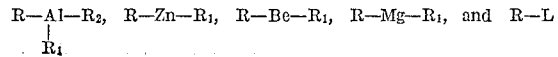

wherein Al is aluminum, Mg is magnesium, Zn is zinc, Be is beryllium, Li is lithium, R is a member selected from the group consisting of hydrogen, an aromatic hydrocarbon radical containing from 6 to 12 carbon atoms, a saturated aliphatic hydrocarbon radical containing 2 to 12 carbon atoms and a saturated cycloaliphatic hydrocarbon radical containing 3 to 12 carbon atoms, each of $R_1$ and $R_2$ is a member selected form the group consisting of hydrogen, a saturated aliphatic hydrocarbon radical containing 2 to 12 carbon atoms, a saturated cycloaliphatic hydrocarbon radical containing 3 to 10 carbon atoms and an aromatic hydrocarbon radical containing 6 to 12 carbon atoms, and halogen when no hydrogen is linked directly to the metallic nucleus, and heating said mixture at a temperature of from 0° C. to 150° C. to cause the formation of a substantially crystalline copolymer of 3-methyl-1-butene and 4-methyl-1-pentene.

5. The method for producing a solid cocrystalline copolymer of allylcyclohexane and 4-cyclohexyl-1-butene having a high degree of crystallinity over the entire composition range as determined by its X-ray diffraction pattern which comprises forming a mixture of allylcyclohexane and 4-cyclohexyl-1-butene, together with a catalyst consisting essentially of a halide of a transition metal selected from the group consisting of group IV–B, group V–B and group VI–B of the periodic table and a compound selected from the group consisting of:

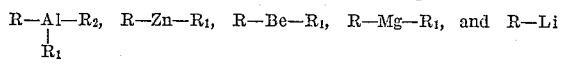

wherein Al is aluminum, Mg is magnesium, Zn is zinc, Be is beryllium, Li is lithium, R is a member selected from the group consisting of hydrogen, an aromatic hydrocarbon radical containing from 6 to 12 carbon atoms, a saturated aliphatic hydrocarbon radical containing 2 to 12 carbon atoms and a saturated cycloaliphatic hydrocarbon radical containing 3 to 12 carbon atoms, each of $R_1$ and $R_2$ is a member selected from the group consisting of hydrogen, a saturated aliphatic hydrocarbon radical containing 2 to 12 carbon atoms, a saturated cycloaliphatic hydrocarbon radical containing 3 to 10 carbon atoms and an aromatic hydrocarbon radical containing 6 to 12 carbon atoms, and halogen when no hydrogen is linked directly to the metallic nucleus, and heating said mixture at a temperature of from 0° C. to 150° C. to cause the formation of a substantially crystalline copolymer of allylcyclohexane and 4-cyclohexyl-1-butene.

6. The method for producing a solid cocrystalline copolymer of allylcyclohexane and a styrene having a high degree of crystallinity over the entire composition range as determined by its X-ray diffraction pattern which comprises forming a mixture of allylcyclohexane and styrene, together with a catalyst consisting essentially of a halide of a transition metal selected from the group consisting of group IV–B, group V–B and group VI–B of the periodic table and a compound selected from the group consisting of:

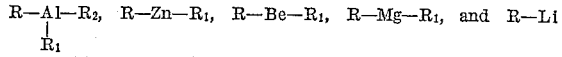

wherein Al is aluminum, Mg is magnesium, Zn is zinc, Be is beryllium, Li is lithium, R is a member selected from the group consisting of hydrogen, an aromatic hydrocarbon radical containing from 6 to 12 carbon atoms, a saturated aliphatic hydrocarbon radical containing 2 to 12 carbon atoms and a saturated cycloaliphatic hydrocarbon radical containing 3 to 12 carbon atoms, each of $R_1$ and $R_2$ is a member selected from the group consisting of hydrogen, a saturated aliphatic hydrocarbon radical containing 2 to 12 carbon atoms, a saturated cycloaliphatic hydrocarbon radical containing 3 to 10 carbon atoms and an aromatic hydrocarbon radical containing 6 to 12 carbon atoms, and halogen when no hydrogen is linked directly to the metallic nucleus, and heating said mixture at a temperature of from 0° C. to cause the formation of a substantially crystalline copolymer of allylcyclohexane and styrene.

7. The method for producing a solid cocrystalline copolymer of styrene, ortho-chlorostyrene, meta-chlorostyrene and para-chlorostyrene having a high degree of crystallinity over the entire composition range as determined by its X-ray diffraction pattern which comprises admixing styrene with a mixture of orthochlorostyrene, meta-chlorostyrene and para-chlorostyrene, together with a catalyst consisting essentially of a halide of a transition metal selected from the group consisting of group IV–B, group V–B and group VI–B of the periodic table and a compound selected from the group consisting of:

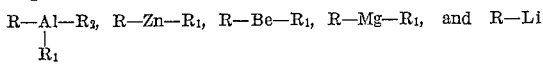

wherein Al is aluminum, Mg is magesium, Zn is zinc, Be is berryllium, Li is lithium, R is a member selected from the group consisting of hydrogen, an aromatic hydrocarbon radical containing from 6 to 12 carbon atoms, a saturated aliphatic hydrocarbon radical containing 2 to 12 carbon atoms and a saturated cycloaliphatic hydrocarbon radical containing 3 to 12 carbon atoms, each of $R_1$ and $R_2$ is a member selected from the group consisting of hydrogen, a saturated aliphatic hydrocarbon radical containing 2 to 12 carbon atoms, a saturated cycloaliphatic hydrocarbon radical containing 3 to 10 carbon atoms and an aromatic hydrocarbon radical containing 6 to 12 carbon atoms, and halogen when no hydrogen is linked directly to the metallic nucleus, and heating the resulting mixture at a temperature of from 0° C. to 150° C. to cause the formation of a substantially crystalline copolymer of styrene, ortho-chlorostyrene, meta-chlorostyrene and para-chlorostyrene.

8. The method for producing a solid cocrystalline copolymer of allylbenzene and 4-phenyl-1-butene having a high degree of crystallinity over the entire composition range as determined by its X-ray diffraction pattern which comprises forming a mixture of allylbenzene and 4-phenyl-1-butene, together with a catalyst consisting essentially of a halide of a transition metal selected from the group consisting of group IV–B, group V–B and group VI–B of the periodic table and a compound selected from the group consisting:

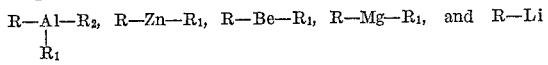

wherein Al is aluminum, Mg is magnesium, Zn is zinc, Be is beryllium, Li is lithium, R is a member selected from the group consisting of hydrogen, an aromatic hydrocarbon radical containing from 6 to 12 carbon atoms, a saturated aliphatic hydrocarbon radical containing 2 to 12 carbon atoms and a saturated cycloaliphatic hydrocarbon radical containing 3 to 12 carbon atoms, each of $R_1$ and $R_2$ is a member selected from the group consisting of hydrogen, a saturated aliphatic hydrocarbon radical containing 2 to 12 carbon atoms, a saturated cycloaliphatic hydrocarbon radical containing 3 to 10 carbon atoms and an aromatic hydrocarbon radical containing 6 to 12 carbon atoms, and halogen when no hydrogen is linked directly to the metallic nucleus, and heating said mixture at a temperature of from 0° C. to 150° C to cause the formation of a substantially crystalline copolymer of allylbenzene and 4-phenyl-1-butene.

9. The method for producing a solid cocrystalline copolymer of styrene and allylbenzene having a high degree of crystallinity over the entire composition range as determined by its X-ray diffraction pattern which comprises forming a mixture of styrene and allylbenzene, together with a catalyst consisting essentially of a halide of a transition metal selected from the group consisting of group IV–B, group V–B and group VI–B of the periodic table and a compound selected from the group consisting of:

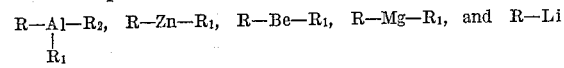

wherein Al is aluminum, Mg is magnesium, Zn is zinc, Be is beryllium, Li is lithium, R is a member selected from the group consisting of hydrogen, an aromatic hydrocarbon radical containing from 6 to 12 carbon atoms, a saturated aliphatic hydrocarbon radical containing 2 to 12 carbon atoms and a saturated cycloaliphatic hydrocarbon radical containing 3 to 12 carbon atoms, each of $R_1$ and $R_2$ is a member selected from the group consisting of hydrogen, a saturated aliphatic hydrocarbon radical containing 2 to 12 carbon atoms, a saturated cycloaliphatic hydrocarbon radical containing 3 to 10 carbon atoms and an aromatic hydrocarbon radical containing 6 to 12 carbon atoms, and halogen when no hydrogen is linked directly to the metallic nucleus, and heating said mixture at a temperature of from 0° C. to 150° C. to cause the formation of a substantially crystalline copolymer of styrene and allylbenzene.

10. The method for producing a solid cocrystalline copolymer of 4-(2-naphthyl)-1-butene and 1-allylnaphthalene having a high degree of crystallinity over the entire composition range as determined by its X-ray diffraction pattern which comprises forming a mixture of 4-(2-naphthyl)-1-butene and 1-allylnaphthalene, together with a catalyst consisting essentially of a halide of a transition metal selected from the group consisting of group IV–B, group V–B and group VI–B of the periodic table and a compound selected from the group consisting of:

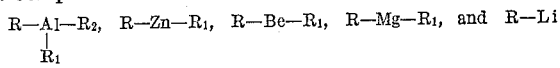

wherein Al is aluminum, Mg is magnesium, Zn is zinc, Be is beryllium, Li is lithium, R is a member selected from the group consisting of hydrogen, an aromatic hydrocarbon radical containing from 6 to 12 carbon atoms, a saturated aliphatic hydrocarbon radical containing 2 to 12 carbon atoms and a saturated cycloaliphatic hydrocarbon radical containing 3 to 12 carbon atoms, each of $R_1$ and $R_2$ is a member selected from the group consisting of hydrogen, a saturated aliphatic hydrocarbon radical containing 2 to 12 carbon atoms, a saturated cycloaliphatic hydrocarbon radical containing 3 to 10 carbon atoms and an aromatic hydrocarbon radical containing 6 to 12 carbon atoms, and halogen when no hydrogen is linked directly to the metallic nucleus, and heating said mixture at a temperature of from 0° C. to 150° C. to cause the formation of a substantially crystalline copolymer of 4-(2-naphthyl)-1-butene and 1-allylnaphthalene.

11. The method for producing a solid cocrystalline copolymer of 1-allylnaphthalene and 4-(1-naphthyl)-1-butene having a high degree of crystallinity over the entire composition range as determined by its X-ray diffraction pattern which comprises forming a mixture of 1-allylnaphthalene and 4-(1-naphthyl)-1-butene, together with a catalyst consisting essentially of a halide of a transition metal selected from the group consisting of group IV–B, group V–B, and group VI–B of the periodic table and a compound selected from the group consisting of:

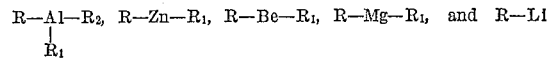

wherein Al is aluminum, Mg is magnesium, Zn is zinc, Be is beryllium, Li is lithium; R is a member selected from the group consisting of hydrogen, an aromatic hydrocarbon radical containing from 6 to 12 carbon atoms, a saturated aliphatic hydrocarbon radical containing 2 to 12 carbon atoms, and a saturated cycloliphatic hydrocarbon radical containing 3 to 12 carbon atoms, each of $R_1$ and $R_2$ is a member selected from the group consisting of hydrogen, a saturated aliphatic hydrocarbon radical containing 2 to 12 carbon atoms, a saturated cycloaliphatic hydrocarbon radical containing 3 to 10 carbon atoms, and an aromatic hydrocarbon radical containing 6 to 12 carbon atoms, and halogen when no hydrogen is linked directly to the metallic nucleus, and heating said mixture at a temperature of from 0° C. to 150° C. to cause the formation of a substantially crystalline copolymer of 1-allylnaphthalene and 4-(1-naphthyl)-1-butene.

12. The method for producing a solid cocrystalline copolymer of 4-(1-naphthyl)-1-butene and 4-(2-naphthyl)-1-butene having a high degree of crystallinity over the entire composition range as determined by its X-ray diffraction pattern which comprises forming a mixture of 4-(1-naphthyl)-1-butene and 4-(2-naphthyl)-1-butene, together with a catalyst consisting essentially of a halide of a transition metal selected from the group consisting of group IV–B, group V–B and group VI–B of the periodic table and a compound selected from the group consisting of:

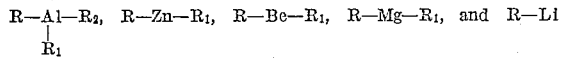

wherein Al is aluminum, Mg is magnesium, Zn is zinc, Be is beryllium, Li is lithium, R is a member selected from the group consisting of hydrogen, an aromatic hydrocarbon radical containing from 6 to 12 carbon atoms, a saturated aliphatic hydrocarbon radical containing 2 to 12 carbon atoms and a saturated cycloaliphatic hydrocarbon radical containing 3 to 12 carbon atoms, each of $R_1$ and $R_2$ is a member selected from the group consisting of hydrogen, a saturated aliphatic hydrocarbon radical containing 2 to 12 carbon atoms, a saturated cycloaliphatic hydrocarbon radical containing 3 to 10 carbon atoms and an aromatic hydrocarbon radical containing 6 to 12 carbon atoms, and halogen when no hydrogen is linked directly to the metallic nucleus, and heating said mixture at a temperature of from 0° C. to 150° C. to cause the formation of a substantially crystalline copolymer of 4-(1-napthyl)-1-butene and 4-(2-naphthyl)-1-butene.

13. The method for producing a solid cocrystalline copolymer of 9-allylfluorene and 2-allylfluorene having a high degree of crystallinity over the entire composition range as determined by its X-ray diffraction pattern which comprises forming a mixture of 9-allylfluorene and 2-allylfluorene, together with a catalyst consisting essentially of a halide of a transition metal selected from the group consisting of group IV–B, group V–B and group VI–B of the periodic table and a compound selected from the group consisting of:

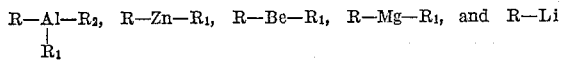

wherein Al is aluminum, Mg is magnesium, Zn is zinc, Be is beryllium, Li is lithium, R is a member selected from the group consisting of hydrogen, an aromatic hydrocarbon radical containing from 6 to 12 carbon atoms, a saturated aliphatic hydrocarbon radical containing 2 to 12 carbon atoms and a saturated cycloaliphatic hydrocarbon radical containing 3 to 12 carbon atoms, each of $R_1$ and $R_2$ is a member selected from the group consisting of hydrogen, a saturated aliphatic hydrocarbon radical containing 2 to 12 carbon atoms, a saturated cycloaliphatic hydrocarbon radical containing 3 to 10 carbon atoms and an aromatic hydrocarbon radical containing 6 to 12 carbon atoms, and halogen when no hydrogen is linked directly to the metallic nucleus, and heating said mixture at a temperature of from 0° C. to 150° C. to cause the formation of a substantially crystalline copolymer of 9-allylfluorene and 2-allylfluorene.

14. The method for producing a solid cocrystalline copolymer of 4-allyl-1-cyclohexene with 4-vinyl-1-cyclohexene having a high degree of crystallinity over the entire composition range as determined by its X-ray diffraction pattern which comprises forming a mixture of 4-allyl-1-cyclohexene with 4-vinyl-1-cyclohexene, together with a catalyst consisting essentially of a halide of a transition metal selected from the group consisting of group IV–B, group V–B and group VI–B of the periodic table and a compound selected from the group consisting of:

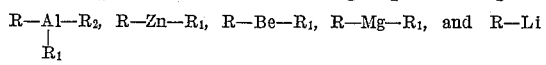

wherein Al is aluminum, Mg is magnesium, Zn is zinc, Be is beryllium, Li is lithium, R is a member selected from the group consisting of hydrogen, an aromatic hydrocarbon containing from 6 to 12 carbon atoms, a saturated aliphatic hydrocarbon radical containing 2 to 12 carbon atoms and a saturated cycloaliphatic hydrocarbon radical containing 3 to 12 carbon atoms, each of $R_1$ and $R_2$ is a member selected from the group consisting of hydrogen, a saturated aliphatic hydrocarbon radical containing 2 to 12 carbon atoms, a saturated cycloaliphatic hydrocarbon radical containing 3 to 10 carbon atoms and an aromatic hydrocarbon radical containing 6 to 12 carbon atoms, and halogen when no hydrogen is linked directly to the metallic nucleus, and heating said mixture at a temperature of from 0° C. to 150° C. to cause the formation of a substantially crystalline copolymer of 4-allyl-1-cyclohexene with 4-vinyl-1-cyclohexene.

15. The method for producing a solid cocrystalline copolymer of 4-allyl-1-cyclohexene and allylcyclohexane having a high degree of crystallinity over the entire composition range as determined by its X-ray diffraction pattern which comprises forming a mixture of 4-allyl-1-cyclohexene and allylcyclohexane, together with a catalyst consisting essentially of a halide of a transition metal selected from the group consisting of group IV–B, group V–B and group VI–B of the periodic table and a compound selected from the group consisting of:

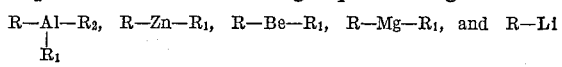

wherein Al is aluminum, Mg is magnesium, Zn is zinc, Be is beryllium, Li is lithium, R is a member selected from the group consisting of hydrogen, an aromatic hydrocarbon radical containing from 6 to 12 carbon atoms, a saturated aliphatic hydrocarbon radical containing 2 to 12 carbon atoms and a saturated cycloaliphatic hydrocarbon radical containing 3 to 12 carbon atoms, each of $R_1$ and $R_2$ is a member selected from the group consisting of hydrogen, a saturated aliphatic hydrocarbon radical containing 2 to 12 carbon atoms, a saturated cycloaliphatic hydrocarbon radical containing 3 to 10 carbon atoms and an aromatic hydrocarbon radical containing 6 to 12 carbon atoms, and halogen when no hydrogen is linked directly to the metallic nucleus, and heating said mixture at a temperature of from 0° C. to 150° C. to cause the formation of a substantially crystalline copolymer of 4-allyl-1-cyclohexene and allylcyclohexane.

16. The method for producing a solid cocrystalline copolymer of allylcyclohexane and vinylcyclohexane having a high degree of crystallinity over the entire composition range as determined by its X-ray diffraction pattern which comprises forming a mixture of allylcyclohexane and vinylcyclohexane, together with a catalyst consisting essentially of a halide of a transition metal selected from the group consisting of group IV–B, group V–B and group VI–B of the periodic table and a compound selected from the group consisting of:

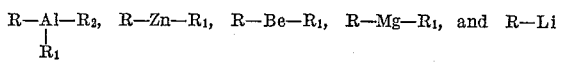

wherein Al is aluminum, Mg is magnesium, Zn is zinc, Be is beryllium, Li is lithium, R is a member selected from the group consisting of hydrogen, an aromatic hydrocarbon radical containing from 6 to 12 carbon atoms, a saturated aliphatic hydrocarbon radical containing 2 to 12 carbon atoms and a saturated cycloaliphatic hydrocarbon radical containing 3 to 12 carbon atoms, each of $R_1$ and $R_2$ is a member selected from the group consisting of hydrogen, a saturated aliphatic hydrocarbon radical containing 2 to 12 carbon atoms, a saturated cycloaliphatic hydrocarbon radical containing 3 to 10 carbon atoms and an aromatic hydrocarbon radical containing 6 to 12 carbon atoms, and halogen when no hydrogen is linked directly to the metallic nucleus, and heating said mixture at a temperature of from 0° C. to 150° C. to cause the formation of a substantially crystalline copolymer of allylcyclohexane and vinylcyclohexane.

17. The method for producing a solid cocrystalline copolymer of 4,4-dimethyl-1-pentene and 5,5-dimethyl-1-hexene having a high degree of crystallinity over the entire composition range as determined by its X-ray diffraction pattern which comprises forming a mixture of 4,4-dimethyl-1-pentene and 5,5-dimethyl-1-hexene, together with a catalyst consisting essentially of a halide of a transition metal selected from the group consisting of group IV–B, group V–B and group VI–B of the periodic table and a compound selected from the group consisting of:

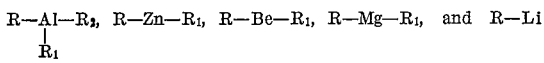

wherein Al is aluminum, Mg is magnesium, Zn is zinc, Be is beryllium, Li is lithium, R is a member selected from the group consisting of hydrogen, an aromatic hydrocarbon radical containing from 6 to 12 carbon atoms, a saturated aliphatic hydrocarbon radical containing 2 to 12 carbon atoms and a saturated cycloaliphatic hydrocarbon radical containing 3 to 12 carbon atoms, each of $R_1$ and $R_2$ is a member selected from the group consisting of hydrogen, a saturated aliphatic hydrocarbon radical containing 2 to 12 carbon atoms, a saturated cycloaliphatic hydrocarbon radical containing 3 to 10 carbon atoms and an aromatic hydrocarbon radical containing 6 to 12 carbon atoms, and halogen when no hydrogen is linked directly to the metallic nucleus, and heating said mixture at a temperature of from 0° C. to 150° C. to cause the formation of a substantially crystalline copolymer of 4,4-dimethyl-1-pentene and 5,5-dimethyl-1-hexene.

18. A method which comprises forming a mixture of 3-methyl-1-butene and 4-methyl-1-pentene, a hydrocarbon diluent and a catalyst consisting essentially of titanium trichloride and triisobutyl-aluminum and heating said mixture from a temperature of 25° C. to 120° C. to cause the formation of a substantially cocrystalline copolymer of 3-methyl-1-butene and 4-methyl-1-pentene having a high degree of crystallinity over the entire composition range as determined by its X-ray diffraction pattern.

19. A method which comprises forming a mixture of 3-methyl-1-butene and 4-methyl-1-pentene, a hydrocarbon diluent and a catalyst consisting essentially of vanadium trichloride and triisobutyl-aluminum and heating said mixture from a temperature of 25° C. to 120° C. to cause the formation of a substantially cocrystalline copolymer of 3-methyl-1-butene and 4-methyl-1-pentene having a high degree of crystallinity over the entire composition range as determined by its X-ray diffraction pattern.

20. A solid cocrystalline copolymer of 3-methyl-1-butene and 4-methyl-1- pentene having a high degree of crystallinity over the entire composition range as determined by its X-ray diffraction pattern.

21. A solid cocrystalline copolymer of 3-methyl-1-pentene and 4-methyl-1-pentene having a high degree of crystallinity over the entire composition range as determined by its X-ray diffraction pattern.

22. A solid cocrystalline copolymer of 3-methyl-1-hexene and 4-methyl-1-pentene having a high degree of crystallinity over the entire composition range as determined by its X-ray diffraction pattern.

23. A solid cocrystalline copolymer of allylcyclopentane and allylcyclohexane having a high degree of crystallinity over the entire composition range as determined by its X-ray diffraction pattern.

24. A solid cocrystalline copolymer of allylcyclohexane and 4-cyclohexyl-1-butene having a high degree of crystallinity over the entire composition range as determined by its X-ray diffraction pattern.

25. A solid cocrystalline copolymer of allylcyclohexane and styrene having a high degree of crystallinity over the entire composition range as determined by its X-ray diffraction pattern.

26. A solid cocrystalline copolymer of 1-allylnaphthalene and 2-vinylnaphthalene having a high degree of crystallinity over the entire composition range as determined by its X-ray diffraction pattern.

27. A solid cocrystalline copolymer of allylbenzene and 4-phenyl-1-butene having a high degree of crystallinity over the entire composition range as determined by its X-ray diffraction pattern.

28. A solid cocrystalline copolymer of styrene and allylbenzene having a high degree of crystallinity over the entire composition range as determined by its X-ray diffraction pattern.

29. A solid cocrystalline copolymer of 4-(2-naphthyl)-1-butene and 1-allylnaphthalene having a high degree of crystallinity over the entire composition range as determined by its X-ray diffraction pattern.

30. A solid cocrystalline copolymer of 1-allylnaphthalene and 4-(1-naphthyl)-1-butene having a high degree of crystallinity over the entire composition range as determined by its X-ray diffraction pattern.

31. A solid cocrystalline copolymer of 4-(1-naphthyl)-1-butene and 4-(2-naphthyl)-1-butene having a high degree of crystallinity over the entire composition range as determined by its X-ray diffraction pattern.

32. A solid cocrystalline copolymer of 9-allylfluorene and 2-allylfluorene having a high degree of crystallinity over the entire composition range as determined by its X-ray diffraction pattern.

33. A solid cocrystalline copolymer of 4-allyl-1-cyclohexene and 4-vinyl-1-cyclohexene having a high degree of crystallinity over the entire composition range as determined by its X-ray diffraction pattern.

34. A solid cocrystalline copolymer of 4-allyl-1-cyclohexene and allylcyclohexane having a high degree of crystallinity over the entire composition range as determined by its X-ray diffraction pattern.

35. A solid cocrystalline copolymer of allylcyclohexane and vinylcyclohexane having a high degree of crystallinity over the entire composition range as determined by its X-ray diffraction pattern.

36. A solid cocrystalline copolymer of 4,4-dimethyl-1-pentene and 5,5-dimethyl-1-hexene having a high degree of crystallinity over the entire composition range as determined by its X-ray diffraction pattern.

References Cited in the file of this patent

UNITED STATES PATENTS

| | | |
|---|---|---|
| 2,181,640 | Deanesly et al. | Nov. 28, 1939 |
| 2,259,934 | Huijser et al. | Oct. 21, 1941 |
| 2,274,749 | Smyers | Mar. 3, 1942 |
| 2,540,949 | Jones | Feb. 6, 1951 |
| 2,568,656 | Parrish | Sept. 18, 1951 |
| 2,731,450 | Serniuk | Jan. 17, 1956 |
| 2,773,052 | Cohen | Dec. 4, 1956 |
| 2,822,357 | Brebner et al. | Feb. 4, 1958 |
| 2,827,445 | Bartolomeo et al. | Mar. 18, 1958 |
| 2,827,446 | Breslow | Mar. 18, 1958 |
| 2,827,447 | Nowlin et al. | Mar. 18, 1958 |
| 2,832,759 | Nowlin | Apr. 29, 1958 |
| 2,842,474 | Pratt | July 8, 1958 |
| 2,842,532 | Campbell | July 8, 1958 |
| 2,868,772 | Ray | Jan. 13, 1959 |

FOREIGN PATENTS

| | | |
|---|---|---|
| 538,782 | Belgium | Dec. 6, 1955 |